United States Patent [19]

Kamiya et al.

[11] 4,234,456

[45] Nov. 18, 1980

[54] IODINE ADSORBENT

[75] Inventors: Kunio Kamiya, Hitachi; Hideo Yusa, Katsuta; Masao Kitamura, Hitachiota; Masaki Takeshima, Hitachi; Toshio Ishidate, Mito, all of Japan

[73] Assignees: Hitachi, Ltd.; Nippon Engelhard Ltd., both of Japan

[21] Appl. No.: 915,136

[22] Filed: Jun. 13, 1978

[30] Foreign Application Priority Data

Jun. 15, 1977 [JP] Japan ................................. 52-69856

[51] Int. Cl.$^2$ ........................ B01J 23/14; B01J 23/50; B01J 23/72; B01J 27/24
[52] U.S. Cl. .................................... 252/438; 252/454; 252/461; 252/463; 252/476; 423/241
[58] Field of Search ............... 252/463, 438, 454, 461, 252/476; 55/71; 423/240 R, 241, 628

[56] References Cited

U.S. PATENT DOCUMENTS

| | | | |
|---|---|---|---|
| 3,392,125 | 7/1968 | Kelly et al. | 423/628 X |
| 3,434,479 | 3/1969 | Till et al. | 252/463 X |
| 3,838,554 | 10/1974 | Wilhelm et al. | 55/71 |
| 4,045,372 | 8/1977 | Warthen et al. | 252/463 |
| 4,088,737 | 5/1978 | Thomas et al. | 423/240 |

*Primary Examiner*—W. J. Shine
*Attorney, Agent, or Firm*—Craig & Antonelli

[57] ABSTRACT

An iodine adsorbent comprises an alumina carrier having a large number of pores having a mean pore size of 200 to 2,000 Å and silver supported on the alumina carrier. The alumina carrier has a pore volume of at least about 0.1 cc/g.

High percent iodine removal is obtained in a highly humid atmosphere, and an amount of silver supported on the carrier is much reduced.

12 Claims, 3 Drawing Figures

IODINE ADSORBENT

This invention relates to an iodine absorbent, and more particularly to an iodine adsorbent suitable for removing radioactive iodine generated in nuclear power plants.

It is an important task in the nuclear power plants to prevent the release of radioactive gases, particularly radioactive iodine comprising elemental iodine ($I_2$) or organic iodine, etc. containing methyl iodide ($CH_3I$) as a main component to assure an evironmental safety. Activated charcoal filters are usually provided in the nuclear power plants to prevent radioactive iodine from its emission to the surrounding atmosphere on occasions of such an accident that a nuclear fuel is dissolved. Recently, iodine-removing devices are increasingly provided at a possible emission source of radioactive iodine and in ventilation systems to reduce an emission amount of radioactive iodine to the surrounding atmosphere as much as possible during the normal operation or at the discontinuation of operation of nuclear power plant.

The active carbon so far employed as an adsorbent for iodine-removing filters has a low iodine removal efficiency at a high humidity, and thus is not desirable for removing iodine from a highly humid gas, especially a tank vent gas, etc. Thus, silver zeolite, in which silver is deposited and supported on zeolite as an adsorbent whose efficiency is not lowered even under the highly humid conditions, has been developed as a substitute for the activated charcoal. However, the silver-zeolite adsorbent has such a disadvantage that, since pore size of zeolite as the carrier is as small as about 10 Å though its specific surface area is large, water is liable to condense in the pores and reaction of silver with iodine is thereby inhibited, lowering the iodine-removing efficiency. Thus, the amount of silver supported on zeolite is made as large as about 0.6 g/g of zeolite to prevent reduction in the iodine removal efficiency even at a high humidity. However, in the absorbent supporting such a large amount of silver, the supported silver is partially covered by condensed water in the porse, and cannot be completely utilized, that is, cannot undergo reaction with iodine, and unutilized silver is usually thrown away as a waste. This is quite uneconomical.

The silver-zeolite absorbent so far developed for the use under the highly humid conditions is not always satisfactory for even increasing application to ventilation system, etc. of the nuclear power plants, and a development of adsorbents having a small amount of silver supported on a carrier but a high iodine removal efficiency even under a highly humid conditions are still in strong demand.

SUMMARY OF THE INVENTION

An object of the present invention is to provide an adsorbent whose iodine removal efficiency is not greatly lowered in a highly humid atmosphere.

Another object of the present invention is to provide an adsorbent having a small amount of iodine-absorbing metal or its composition of the metal supported on a carrier.

The present invention is characterized by supporting an iodine-absorbing metal or its composition of the metal on a carrier having a large number of pores having a mean pore size of 200 to 2,000 Å, and preferably by a pore volume of a carrier being at least 0.1 g/cc.

DESCRIPTION OF THE PREFERRED EMBODIMENTS

The present invention has been established by confirming percent methyl iodide ($CH_3I$) removals of various iodine adsorbents having different pore sizes through tests. The iodine adsorbent used is a silver-alumina adsorbent supporting silver as an iodine-absorbing metal on the surfaces of alumina carrier, where silver in such an amount of 0.1 g/g carrier, which is one-sixth of the conventional amount, is supported on the alumina carrier. Alumina carriers having different mean pore sizes are prepared in the manner as will be described later. The pore size of alumina carrier can be adjusted to desired ones by adjusting a calcining temperature of alumina carriers. The mean pore size of alumina carriers is determined according to the well known mercury porosimeter method.

Figure 1:
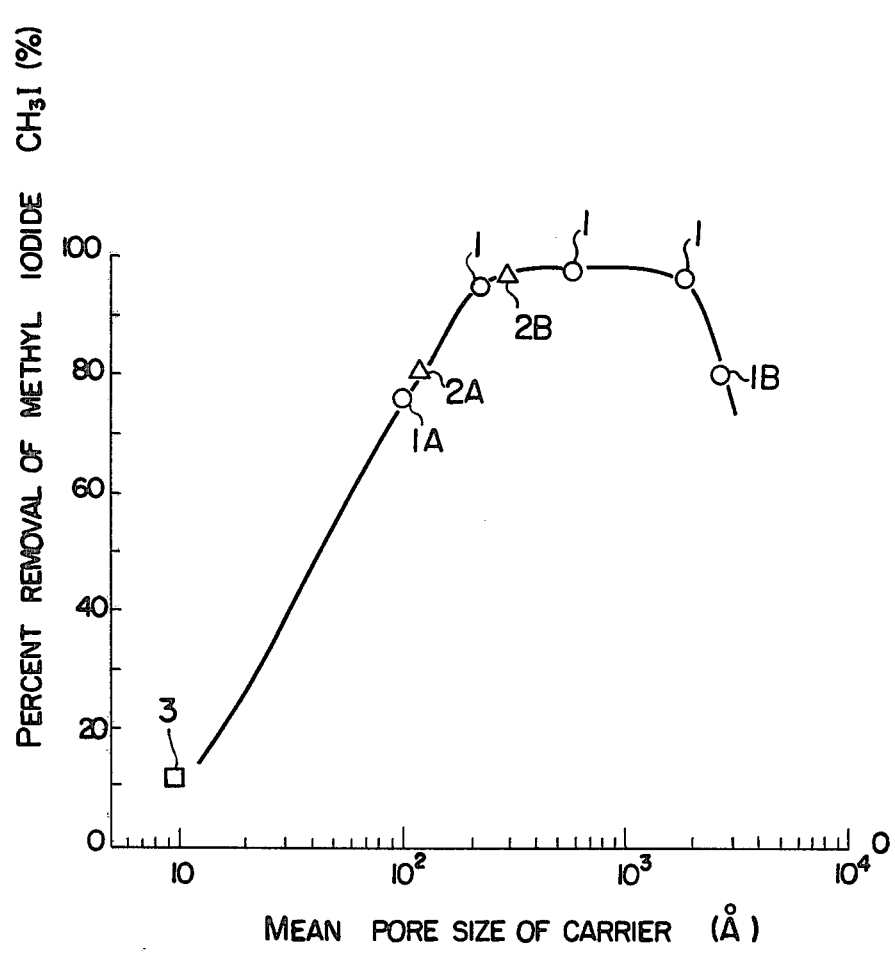
FIG. 1 is a characteristic diagram showing relations between means pore size of carrier and percent $CH_3I$ removal of silver-supported carrier as an adsorbent.

The precent $CH_3I$ removal is determined by tests simulating highly humid gas treatments. That is, gasses containing $CH_3I$ at a temperature of 20° C. and a relative humidity of 80% are passed through the beds of silver-alumina adsorbents having predetermined same thickness at a speed of 50 cm/sec. The results of tests are shown in FIG. 1. Circle marks on FIG. 1 show the percent $CH_3I$ removal of silver-alumina adsorbent based on alumina carriers, triangle marks that of silver-silica gel adsorbent based on silica gel carriers, which will be described later, and square mark that of the conventional silver-zeolite adsorbent based on zeolite carriers.

It is seen from the characteristic diagram of FIG. 1 that the percent $CH_3I$ removal of silver-alumina adsorbents based on the alumina carriers having mean pore sizes of 200 to 2,000 Å are sufficiently high, and the silver-alumina adsorbent based on the alumina carrier having said range of mean pore sizes is effective as the iodine adsorbent, even if an amount of silver supported is small. The reason why the percent $CH_3I$ removal is lowered at a mean pore size below 200 Å, as shown by 1A in FIG. 1 is that water in the gas is condensed in the pores of the alumina carriers, and the condensed water lowers the activity of supported silver, whereas the reason why the percent removal is lowered even at a mean pore size above 2,000 Å as shown by 1B in FIG. 1 is that the pore volume of alumina carrier is lowered.

Procedure for preparing a silver-alumina adsorbent will be described in detail below.

Alumina carrier is prepared in the following manner:

4 N aqua ammonia is slowly added to an aqueous 10 wt. % aluminum sulfate solution, and pH is adjusted to 5–10. The resulting mixture is left standing for 24 hours, and then filtered, and the resulting cakes are washed with clean water. The resulting alumina gel is dried at about 120° C., whereby alumina powders are obtained. 1 kg of the alumina powders and 30 g of bentonite are added to 15 cc of nitric acid/1 of $H_2O$, and thoroughly kneaded by kneader mixer. Then, the kneaded mixture is extruded from dies having an opening diameter of 1 mm, shredded, and then granulated into spheres by a granulator. The resulting spherical particles are calcined at a temperature of 800°–1,400° C., whereby alumina carrier particles having diameters of 1–2 mm are obtained, where mean pore sizes of the carriers can be adjusted to a range of 200–2,000 Å by setting said calcining temperature in said range, and the pore volume of the carriers at pore sizes of 200–2,000 Å can be adjusted by adjusting the calcining temperature and pH in said step of alumina gel formation.

Silver is supported on the alumina carrier particles by the following treatment. 50 g of alumina carrier particles is placed in 50 cc of 0.1 N nitric acid, retained at room temperature for 15 minutes, then filtered, admixed with 8.2 g of silver nitrate/20 cc of $H_2O$, and dried at about 100° C.

Results of measurements of percent $CH_3I$ removal of various silver-alumina adsorbents (amount of silver supported: 0.1 g/g of carrier), obtained by changing preparation conditions in said procedure are shown in the following Table 1 together with the preparation conditions, etc.

TABLE 1

| No. | Preparation conditions | | Pore volume of alumina carrier having mean pore size of 200-2,000 Å (cc/g) | Percent $CH_3I$ removal (%) |
|---|---|---|---|---|
| | Gel formation pH | Calcining temperature (°C.) | | |
| I | 8.5 | 900 | 0.30 | 95 |
| II | 7.8 | 1100 | 0.32 | 98 |
| III | 7.0 | 1200 | 0.30 | 97 |
| IV | 8.0 | 1200 | 0.20 | 88 |
| V | 8.5 | 1250 | 0.09 | 81 |
| VI | 8.0 | 1400 | 0.06 | 76 |

The conditions for measuring the percent $CH_3I$ removal are the same as those for determining the characteristics of said FIG. 1. Pore volume of the alumina carrier is likewise determined according to the mercury porosimeter method. It is seen from these results that there are correlations between the pore volume of alumina carriers having mean pore sizes of 200–2,000 Å and the percent $CH_3I$ removal.

Figure 2:
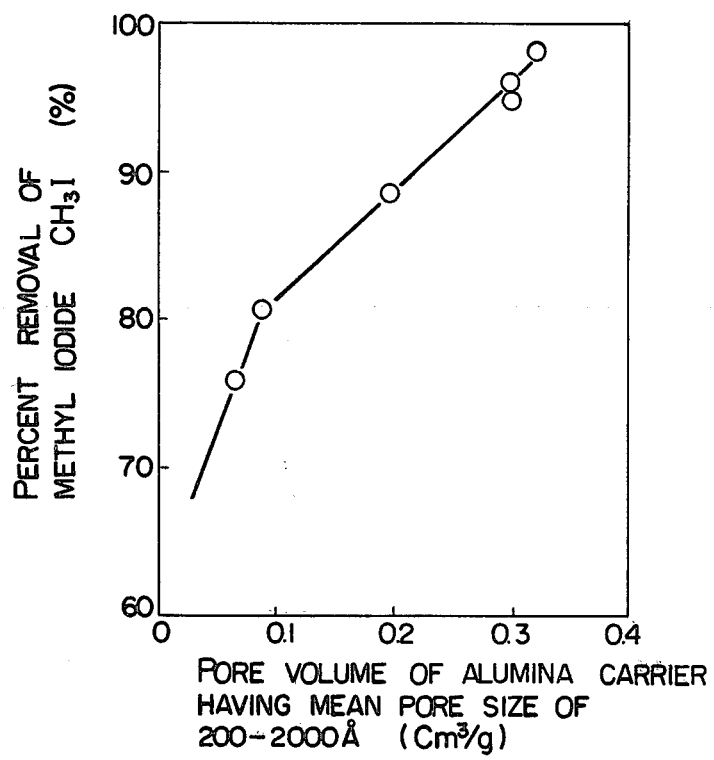
FIG. 2 is a characteristic diagram showing relations between pore volume of alumina carriers having mean pore sizes of 200–2,000 Å and precent $CH_3I$ removal.

FIG. 2 shows percent $CH_3I$ removal of various silver-alumina adsorbents against pore volumes of alumina carriers having mean pore sizes of 200–2,000 Å to make correlations described above clearer. It is seen from FIG. 2 that, when the pore volume of the alumina carrier having mean pore sizes of 200–2,000 Å is below 0.1 cc/g, the percent $CH_3I$ removal is considerably lowered, and the adsorbents are not suitable as the iodine adsorbent.

As described above, relations between physical properties of various silver-alumina adsorbents and the percent $CH_3I$ removal are investigated, whereby it is found that the present $CH_3I$ removal of silver-alumina adsorbents based on alumina carriers having mean pore sizes of 200–2,000 Å is considerably enhanced even at a high humidity such as a relative humidity of 80%, and especially it is desirable that the pore volume of the alumina carrier is at least 0.1 cc/g.

Effects of the present invention will be described, below.

Alumina carrier particles having a mean pore size of 600 Å and a pore volume of 0.32 cc/g are prepared in the manner that pH is set to 8.5 in the step of alumina gel formation and calcining temperature is set to 1,100° C. in the step of calcining alumina, and silver as silver nitrate is supported on the alumina carrier particles at 0.1 g of silver/g of carrier, thereby obtaining a silver-alumina adsorbent.

Figure 3:
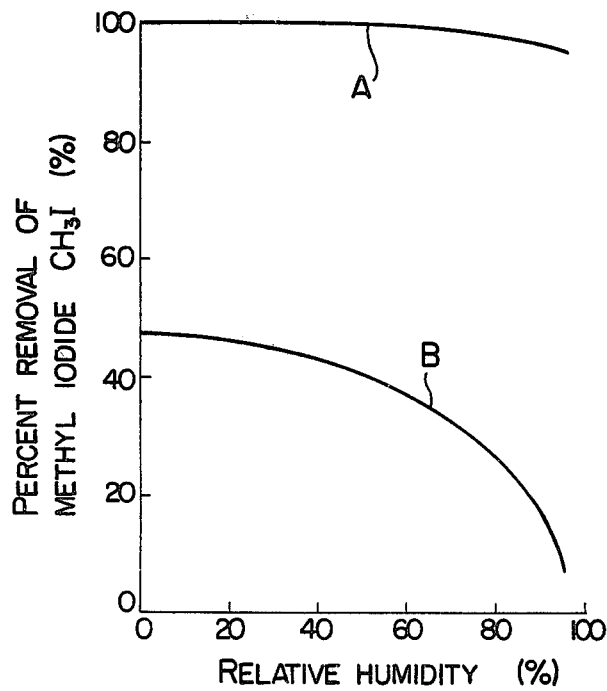
FIG. 3 is a characteristic diagram showing a dependency of a silver-alumina adsorbent as one preferable embodiment of the present invention and the conventional silver-zeolite adsorbent upon a relative humidity.

FIG. 3 shows a dependency of the silver-alumina adsorbent obtained under said preparation conditions (mean pore size: 600 Å, pore volume: 0.32 cc/g and amount of silver supported: 0.1 g/g of carrier) and the conventional silver zeolite (amount of silver supported: 0.1 g/g of carrier) upon a relative humidity, where the conditions for measuring the percent $CH_3I$ removal are the same as described above. In FIG. 3, the plot indicated by "A" shows the characteristics of the present silver-alumina adsorbent, and that by "B" shows those of the conventional silver-zeolite adsorbent. It is seen from FIG. 3 that the percent $CH_3I$ removal of the present silver-alumina adsorbent is higher than that of the conventional silver-zeolite adsorbent, and further that the lowering of the percent $CH_3I$ removal of the present adsorbent is much smaller at a high relative humidity. That is, the percent $CH_3I$ removal is about 97% at a relative humidity of 90%, and about 96% even at a relative humidity of 95%. Thus, it is possible to treat such a highly humid gas by using the present adsorbents as a vent gas from a storage tank for liquid radioactive waste (relative humidity: about 80%), etc. which is one of radioactive iodine emission sources in nuclear power plants. And also such an effect that the amount of silver supported can be made less than that of the conventional silver-zeolite adsorbent (0.6 g/g of carrier) can be brought about in the present invention.

In the foregoing description, alumina and silver are used as the carrier and the metal supported, respectively, but the present adsorbent is not restricted to the alumina and the silver. That is, the percent iodine removal can be enhanced to the level of said alumina by using other carriers such as silica gel, etc., so long as their mean pore sizes are adjusted to 200–2,000 Å, and their pore volumes are adjusted to at least 0.1 cc/g.

500 cc of water glass comprising silicon oxide and sodium oxide is dissolved in 1 l of water, and a solution of 245 cc of 4 N hydrochloric acid/300 cc of $H_2O$ is prepared separately at the same time. These two solutions are joined together, and the resulting mixture is left standing for about one hour, while gels are formed in the mixture. Then, the mixture is treated by an aqueous of 1 N ammonium nitrate solution, washed with water, dried at 150° C. for 4 hours, then granulated, and calcined at 500°–1,000° C. in air, whereby silica gel carrier particles having mean pore sizes of 200–2,000 Å are obtained. The pore size of the carrier depends mainly upon a calcining temperature. Silver is supported on the silica gel carrier particles in the following manner.

100 g of the silica gel carrier particles is placed in 100 cc of 0.1 N nitric acid, maintained at room temperature for 15 minutes, then filtered, admixed with 16.4 g of silver nitrate/40 cc of $H_2O$, and then dried at about 100° C., whereby a silver-silica gel adsorbent is obtained.

It is more difficult in the case of the silica gel carrier to adjust the mean pore size to 200–2,000 Å than in the case of alumina carrier, and the silica gel is more fragile when it absorbs water.

"2 B" in FIG. 1 is a plot of the percent $CH_3I$ removal of the silver-silica gel adsorbent based on the silica gel carrier having a mean pore size of 250 Å prepared in said manner, where the percent $CH_3I$ removal is higher than that of "2 A" for silica gel having a mean pore size below 200 Å, obtained by calcination at a low temperature (less than 500° C.). Thus, said ranges of the present invention are also applicable to the silica gel. The adsorbent based on said silica gel carrier has the similar effects as the siliver-alumina adsorbent based on the alumina carrier.

The property of iodine adsorbents depends upon mean pore sizes of the adsorbents, irrespective of kinds of the carrier, that is, amorphous state or crystalline state of the carrier, and carriers having mean pore sizes of 200–2,000 Å are effective as the carrier for iodine-removing adsorbents. The carriers are not restricted only to particles, and similar effects can be obtained even in such an integrated structure as a honeycomb structure.

As an iodine-adsorbing metal to be supported on the carrier, copper, lead, etc. are also effective besides silver. Amounts of $CH_3I$ adsorbed by the respective metals are shown in the following Table 2.

TABLE 2

| Metal supported in nitrate form | Amount of $CH_3I$ absorbed |
| --- | --- |
| Ag | 0.26 m mol $CH_3I$/mol metal |
| Cu | 0.16 m mol $CH_3I$/mol metal |
| Pb | 0.15 m mol $CH_3I$/mol metal |
| Zn | 0.13 m mol $CH_3I$/mol metal |
| Cd | 0.12 m mol $CH_3I$/mol metal |
| Ni | 0.10 m mol $CH_3I$/mol metal |
| Co | 0.08 m mol $CH_3I$/mol metal |

These values are measured according to a static adsorption test at a gas temperature of 56° C. for an adsorption time of 90 minutes.

Copper, lead or their nitrate compounds were supported on alumina carrier having said range of mean pore sizes, prepared under the preparation conditions, No. 2 in Table 1, and percent $CH_3I$ removals of these adsorbents were measured, and were found to be about twice those of adsorbents of these metals or their compounds supported on alumina carriers having mean pore sizes of less than 200 Å. The iodine removal efficiency of the adsorbents depends upon the kind of metals, but a high percent removal can be obtained when carriers having mean pore sizes of 200–2,000 Å are used as in the case of silver. The amounts of metals supported can be also reduced.

In the foregoing description, the procedures for preparing a carrier and supporting a metal thereon have been explained, but the present invention is not restricted to said procedures. That is, various procedures depending upon the kind of the carrier can be employed. For example, the alumina carrier is prepared by neutralization and precipitation of alumina nitrate by aqua ammonia, but it can be also prepared by hydrolysis of sodium aluminate or gel formation by the heat of basic aluminum sulfate.

The present adsorbent is not restricted to radioactive iodine in a vent gas from nuclear power plants, but also is applicable, for example, to cases of removing impurities such as sulfur dioxide or nitrogen oxides from a flue gas containing a large amount of water vapor.

According to the present invention, iodine, particularly radioactive iodine can be satisfactorily removed even in a highly humid condition.

What is claimed is:

1. An iodine adsorbent which consists essentially of a carrier having a large number of pores having a mean pore size of 200–2,000 Å, and an iodine-adsorbing material selected from the group consisting of Ag, Cu, Pb and an iodine-adsorbing salt of Ag, Cu, or Pb, supported on the carrier.

2. An iodine adsorbent according to claim 1, wherein the carrier consists of alumina or silica gel.

3. An iodine adsorbent according to claim 1, wherein the carrier has a pore volume of at least about 0.1 cc/g.

4. An iodine adsorbent according to claim 3, wherein the carrier consists of alumina or silica gel.

5. An iodine adsorbent according to claim 4, wherein the iodine-adsorbing salt is a nitrate.

6. An iodine adsorbent which consists essentially of a carrier having a large number of pores having a mean pore size of 200–2,000 Å, and an iodine-absorbing material selected from the group consisting of Ag, Cu, Pb and an iodine-adsorbing salt of Ag, Cu, or Pb supported on said carrier, said carrier consisting of alumina or silica gel and having a pore volume or at least about 0.1 cc/g.

7. An iodine adsorbent according to claim 6, wherein said iodine-absorbing material is silver or a silver salt and said iodine-adsorbing material is present in an amount corresponding to 0.1 gram of silver per gram of carrier.

8. An iodine adsorbent according to claim 1, wherein the carrier supports silver or a silver salt in an amount corresponding to silver in an amount of 0.1 g/g carrier.

9. An iodine adsorbent which consists essentially of a carrier having a large number of pores having a mean pore size of 200–2,000 Å, and silver or a silver salt supported on the carrier, said carrier supporting the silver or silver salt in an amount corresponding to silver in an amount of 0.1 g/g of the carrier.

10. An iodine absorbent according to claim 8, wherein the carrier is alumina or silica gel.

11. An iodine adsorbent according to claim 1, wherein the carrier is an inorganic carrier.

12. An iodine adsorbent according to claim 3, wherein the metal salt is a nitrate.

* * * * *